No. 727,511. PATENTED MAY 5, 1903.
F. J. WARREN.
STREET SHEET PAVEMENT OR ROADWAY.
APPLICATION FILED MAR. 20, 1902.
NO MODEL.
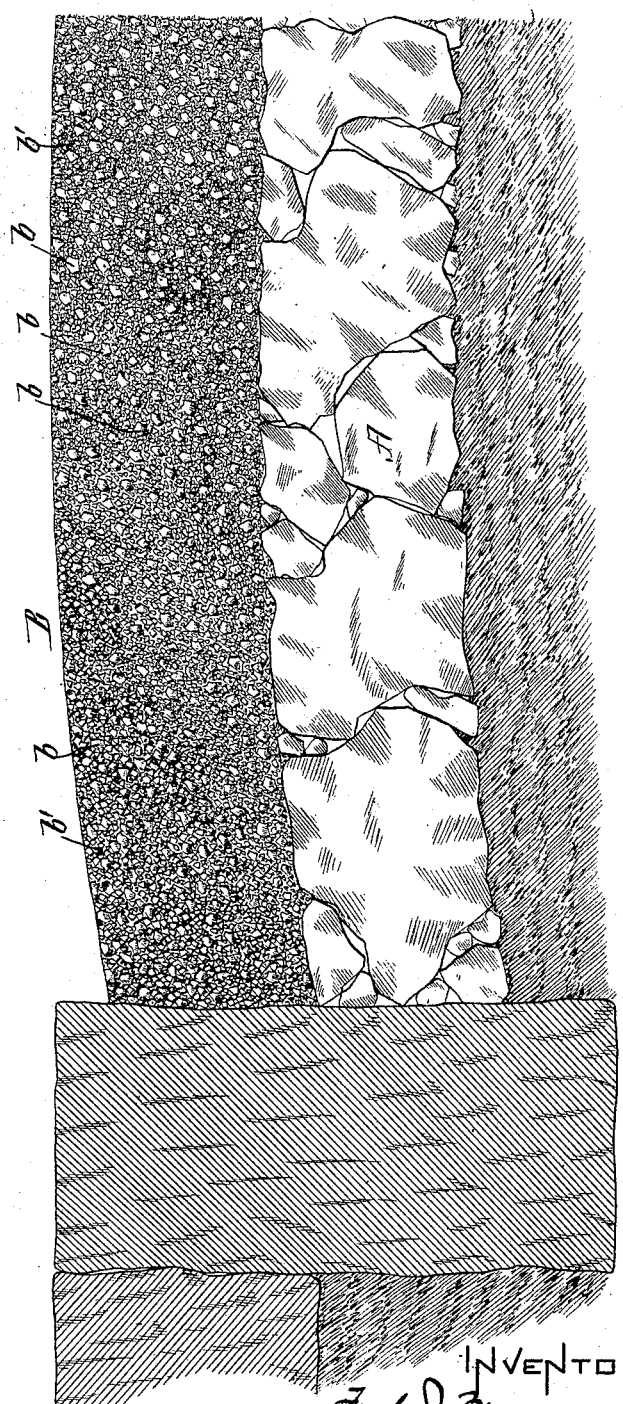

No. 727,511. Patented May 5, 1903.

UNITED STATES PATENT OFFICE.

FREDERICK J. WARREN, OF NEWTON, MASSACHUSETTS.

STREET SHEET PAVEMENT OR ROADWAY.

SPECIFICATION forming part of Letters Patent No. 727,511, dated May 5, 1903.

Application filed March 20, 1902. Serial No. 99,127. (No specimens.)

*To all whom it may concern:*

Be it known that I, FREDERICK J. WARREN, a citizen of the United States, residing at Newton, in the county of Middlesex and State of Massachusetts, have invented a new and useful Improvement in Street Sheet Pavements or Roadways, of which the following is a full, clear, and exact description, reference being had to the accompanying drawings, forming a part of this specification, in explaining its nature.

The invention is an improvement upon that described in my Letters Patent of the United States No. 675,430, dated June 4, 1901. In the said patent I have described a wearing-section of a street or roadway sheet-pavement which possesses valuable properties theretofore unknown in street sheet-pavements and arising from the character of the mineral base employed, whereby an inherent stability to the wear of traffic is obtained and one that is not dependent upon the bituminous composition which is used and one that is not dependent upon any other medium and whereby also the smallest or very nearly the smallest percentage of voids to be filled is provided and which voids are filled with a bituminous composition which serves to coat and to unite the mineral ingredients and to form therewith a water and weather proof covering to the subfoundation. While I have described in said patent the means which are best adapted for producing generally the results specified, yet for certain uses the sizes of the mineral ingredients may be considerably varied from that described in the patent and still a desirable inherent stability be obtained. This, however, cannot be effected without to some extent increasing the proportion of voids in the mineral body, and a wearing-section such as I am about to describe will require a larger percentage of bituminous composition to fill the voids.

In practicing the invention I select mineral ingredients from about a quarter of an inch in diameter running down to an impalpable powder and in such proportions as to reduce the percentage of voids to practically as low a limit as can be secured by the use of mineral elements of such a size. These elements will compose from about ninety-one to ninety-four per cent. of the entire wearing layer when laid, and the bituminous composition used in filling the voids and interstices and uniting the ingredients will compose from six to nine per cent. of the layer. The mineral ingredients of the various sizes are carefully proportioned to each other and then mixed with each other and with the bituminous composition, whereby they are uniformly combined and united with the composition before they are laid on the subfoundation of the roadway or street. This preferably is done at about a temperature of 200°, and the coated ingredients thus uniformly combined together are laid upon the roadway to any desired thickness, from two to three or four inches, and then thoroughly combined with the subfoundation prepared to receive them by heavy pressure, such as is obtained by the use of a fifteen or twenty ton roller, the pressure being continued until the whole body is formed into a solid continuous tenacious layer.

The sizes of the mineral ingredients herein specified permit a thinner wearing-layer to be formed than can be formed with mineral ingredients of a larger size.

I will now describe the invention in conjunction with the drawing forming a part of this specification, where the figure represents in vertical cross-section a portion of a street sheet roadway or pavement having the features of my invention.

Referring to the drawing, A represents a conventional subfoundation of a pavement or roadway, and B the wearing-section thereof. The larger range of elements in the wearing-section is lettered *b*, and the smaller range *b'*. It is of course not possible to indicate all the various sizes by letter. The ingredients or elements vary as to their proportions about as follows: of those which will pass a screen having a mesh one-fourth inch in diameter, about fifty-five per cent.; of those which will pass a screen having a mesh one-tenth inch in diameter, about fifteen per cent.; of those which will pass a screen having a mesh known as "No. 40," about ten per cent.; of those which will pass a screen having a mesh known as "No. 80," about ten per cent.; of those which will pass a screen having a mesh known as "No. 200," about ten per cent. It will be understood that this formula is not to be considered as an arbitrary one and may be reasonably varied as to the size and mesh of the screen and as to the proportions which the various sizes of the elements bear to each other, the purpose of this part of the invention being to so combine various sizes of ingredients having substantially the range indicated as to produce a base for a wearing layer of a street sheet-pavement having inherent stability and such an elimination of voids as would naturally result from their association. The said ingredients in about the proportions indicated uniformly assembled together will eliminate about as large a percentage of voids in a mineral body composed of such elements as is commercially practicable and will require from six to nine per cent. of bituminous composition to coat the ingredients and fill the voids. The various sizes are carefully graded and are also carefully measured to bear the proportions to each other indicated and are uniformly associated with each other and coated with the requisite amount of bituminous composition in a mixer, preferably at about 200° Fahrenheit. The coated ingredients are then assembled or laid uniformly upon a prepared foundation to the desired depth and are united together thereon and to the foundation by the employment of very heavy pressure, much heavier than has ever been applied to bituminous pavements before the invention of my said patent, pressure supplied by a fifteen or twenty ton steam-roller being preferable. Heretofore it has not been possible to use such a pressure in laying the wearing-section of a bituminous street sheet-pavement, because the section did not possess the stability which permitted such large pressures to be employed.

Having thus fully described my invention, I claim and desire to secure by Letters Patent of the United States—

1. A mixture of mineral or wearing ingredients of several grades ranging from within one-fourth inch down to an impalpable powder, the grades being so proportioned as to give the pavement an inherent stability.

2. A mixture of mineral or wearing ingredients of several grades proportioned as follows: about fifty-five per cent. of the material passing one-fourth-inch mesh and stopping at one-tenth inch, about fifteen per cent. between one-tenth-inch mesh and mesh No. 40, about ten per cent. between meshes No. 40 and No. 80, about ten per cent. between meshes No. 80 and No. 200 and about ten per cent. passing mesh No. 200.

3. A mixture of mineral or wearing ingredients of several grades and so proportioned that the per cent. of voids to the whole is only about six to nine per cent.

4. A paving mixture comprising several grades of mineral ingredients and a binder composing about six to nine per cent. of the whole mixture.

5. A paving mixture comprising several grades of mineral or wearing ingredients ranging from one-fourth inch to an impalpable powder and an asphaltic binder composing about six to nine per cent. of such mixture.

6. A paving mixture comprised of several grades of mineral or wearing ingredients so proportioned as to possess an inherent stability in combination with a binder composing about six to nine per cent. of the whole mixture.

7. A mixture of mineral or wearing ingredients of several grades ranging from about one-fourth inch down, whereof about fifty-five per cent. of the material will not pass a one-tenth-inch mesh.

8. A mixture of mineral or wearing ingredients of several grades ranging from about one-fourth inch down and whereof fifty-five per cent. will not pass a one-tenth-inch mesh in combination with a binder occupying a space only about six to nine per cent. of the whole.

9. A paving mixture of mineral or wearing ingredients of several grades ranging from one-fourth inch down and so proportioned as to have an inherent stability that will permit of the binder being forced into intimate relation with the same at a pressure ranging as high as that delivered by a fifteen or twenty ton roller.

10. A mixture of mineral or wearing ingredients only of several grades and so proportioned as to possess such a stability that a binder may be forced into intimate relation with the same without disturbing the relative position of the mineral ingredients at pressures ranging as high as that delivered by a fifteen or twenty ton roller.

11. The method of laying a pavement consisting in selecting mineral or wearing ingredients of several grades in such proportion as to give their structure an inherent stability, applying a bituminous binding material to such material and then subjecting the structure to a pressure about that of a fifteen or twenty ton roller.

12. The method of laying a pavement consisting in selecting mineral or wearing ingredients of such grade as to give their structure an inherent stability when in place, applying a fluid or semifluid binder to said ingredients and rolling the structure at pressures ranging as high as that of a fifteen to twenty ton roller.

13. A wearing-section of a street sheet-pavement consisting of a mineral body composed of stony elements varying in size from about a quarter of an inch to an impalpable powder, combined in about the proportions indicated, adapted to provide an inherent stability, coated with a bituminous medium before they are laid upon the subfoundation and then laid upon it to the desired depth and combined with it and with each other by heavy pressure whereby it is solidified and the bituminous composition caused to completely fill the voids and form water and weather proof uniting joints as and for the purposes set forth.

FREDERICK J. WARREN.

In presence of—
   F. F. RAYMOND, 2d,
   J. M. DOLAN.